(12) United States Patent
Murakami et al.

(10) Patent No.: US 12,461,504 B2
(45) Date of Patent: Nov. 4, 2025

(54) COMMUNICATIONS SYSTEM FOR NUMERICAL CONTROL DEVICES AND COMMUNICATIONS METHOD FOR NUMERICAL CONTROL DEVICES

(71) Applicant: FANUC CORPORATION, Yamanashi (JP)

(72) Inventors: Takafumi Murakami, Yamanashi (JP); Takahiro Omori, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 195 days.

(21) Appl. No.: 18/255,073

(22) PCT Filed: Nov. 29, 2021

(86) PCT No.: PCT/JP2021/043566
§ 371 (c)(1),
(2) Date: May 30, 2023

(87) PCT Pub. No.: WO2022/118782
PCT Pub. Date: Jun. 9, 2022

(65) Prior Publication Data
US 2024/0027997 A1    Jan. 25, 2024

(30) Foreign Application Priority Data
Dec. 1, 2020 (JP) .................. 2020-199596

(51) Int. Cl.
*G05B 19/414* (2006.01)
*G05B 19/408* (2006.01)

(52) U.S. Cl.
CPC ......... *G05B 19/414* (2013.01); *G05B 19/408* (2013.01)

(58) Field of Classification Search
CPC ............................ G05B 19/414; G05B 19/408
See application file for complete search history.

(56) References Cited

U.S. PATENT DOCUMENTS

2013/0187589 A1\* 7/2013 Okita ........................ G05B 9/02
318/566
2018/0348284 A1\* 12/2018 Tateda ................... G01R 31/64

FOREIGN PATENT DOCUMENTS

JP    2000-295894 A    10/2000
JP    2003-348892 A    12/2003
(Continued)

OTHER PUBLICATIONS

International Search Report issued in PCT/JP2021/043566; mailed Jan. 25, 2022.

*Primary Examiner* — Zoheb S Imtiaz
(74) *Attorney, Agent, or Firm* — Studebaker Brackett PLLC

(57) ABSTRACT

This communications system for numerical control devices includes a numerical control device, a converter device, and a plurality of inverter devices. This communications system for numerical control devices comprises an application unit and a determination unit. The application unit applies identification information to the inverter devices. The determination unit determines the inverter device, among the plurality of inverter devices that have had identification information applied thereto, that will be used for communications with the numerical control device and the converter device. The numerical control device comprises a numerical control communications unit that communicates with the inverter device using a first transmission path. The converter device comprises a converter communications unit that communicates with the numerical control device via: a second transmission path different from the first transmission path; the inverter device determined by the determination unit; and the first transmission path.

5 Claims, 5 Drawing Sheets

(56) References Cited

FOREIGN PATENT DOCUMENTS

| JP | 2013-153607 A | 8/2013 |
| JP | 2014-006817 A | 1/2014 |
| JP | 2020-091623 A | 6/2020 |

* cited by examiner

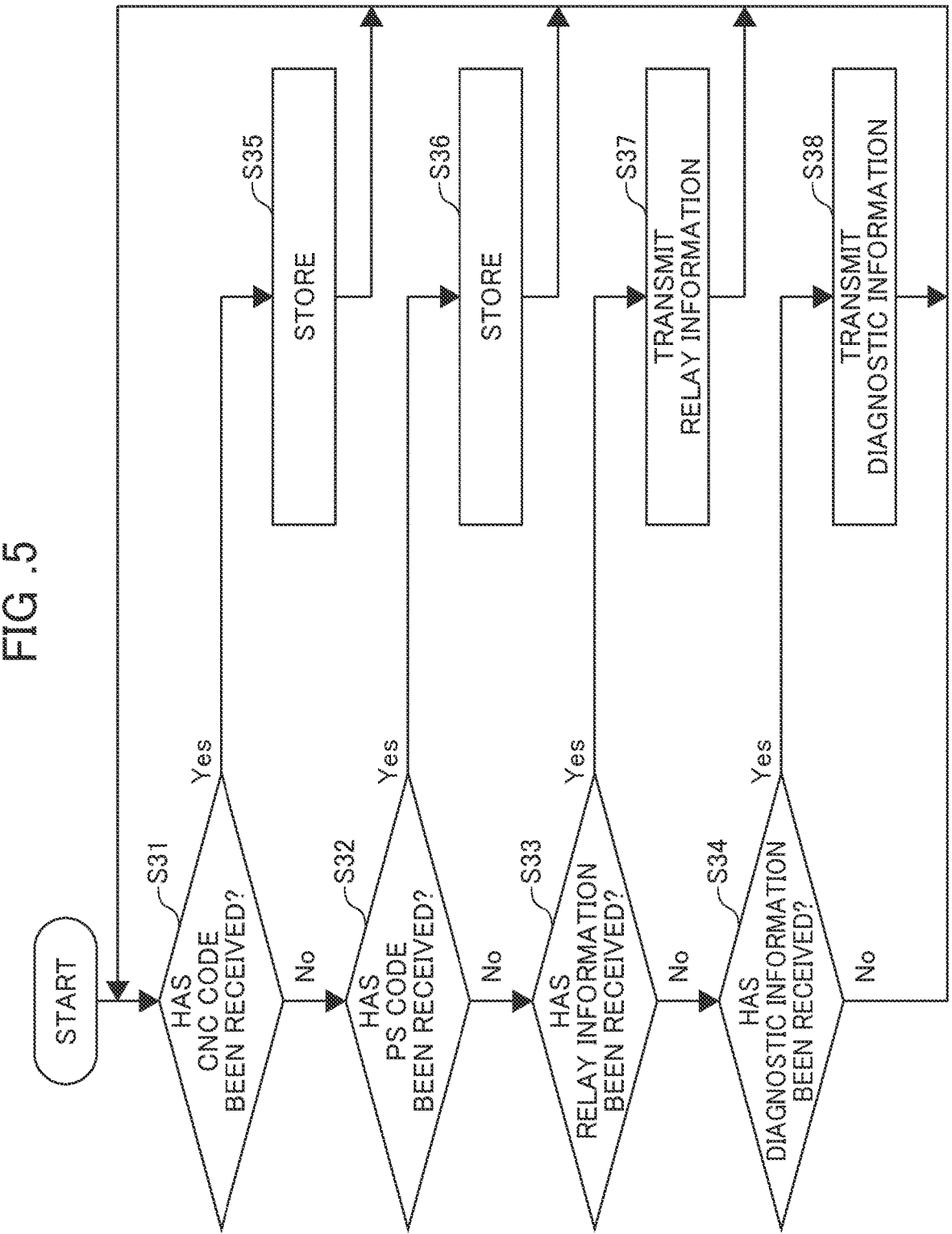

COMMUNICATIONS SYSTEM FOR NUMERICAL CONTROL DEVICES AND COMMUNICATIONS METHOD FOR NUMERICAL CONTROL DEVICES

TECHNICAL FIELD

The present invention relates to a communication system for a numerical control device and a communication method for a numerical control device.

BACKGROUND ART

A machine tool includes a motor such as a servo motor or a spindle motor for each drive shaft. A servo control system that controls these motors controls, for example, the speed and torque of each motor, and the position of the rotor of each motor.

Such a servo control system includes, for example, a converter device that converts alternating current input from a power source into direct current and outputs it, and an inverter device that converts the direct current output from the converter device into alternating current of a desired frequency for driving the motor and outputs it.

In a servo control system, when a numerical control device is directly connected to a converter device, or when a plurality of converter devices are directly connected to each other, a lot of transmission paths are required, such that the transmission paths are costly. In addition, such a servo control system increases communication traffic. Further, to ensure high-speed and high-precision control in such a servo control system, high-performance processors and large-capacity memories are required in the numerical control device and the converter device, which causes further costs.
Patent Document 1: Japanese Unexamined Patent Application, Publication No. 2013-153607

DISCLOSURE OF THE INVENTION

Problems to be Solved by the Invention

A problem to be solved by embodiments of the present invention is to provide a communication system for a numerical control device and a communication method for a numerical control device with less communication traffic than conventional ones.

Means for Solving the Problems

A communication system for a numerical control device according to an embodiment includes a numerical control device, a converter device, and a plurality of inverter devices. The communication system for a numerical control device according to the embodiment includes an assigning part and a determination part. The assigning part assigns identification information to the plurality of inverter devices. The determination part determines an inverter device to be used for communication between the numerical control device and the converter device from among the plurality of inverter devices to which the identification information is assigned. The numerical control device includes a numerical control communication part that communicates with the inverter device using a first transmission path. The converter device includes a converter communication part that communicates with the numerical control device via a second transmission path different from the first transmission path, the inverter device determined by the determination part, and the first transmission path.

Effects of the Invention

The present invention can reduce communication traffic compared to conventional art.

BRIEF DESCRIPTION OF THE DRAWINGS

FIG. 5 is a flowchart showing an example of processing by a processor of an inverter device shown in FIG. 2.

PREFERRED MODE FOR CARRYING OUT THE INVENTION

Figure 1:
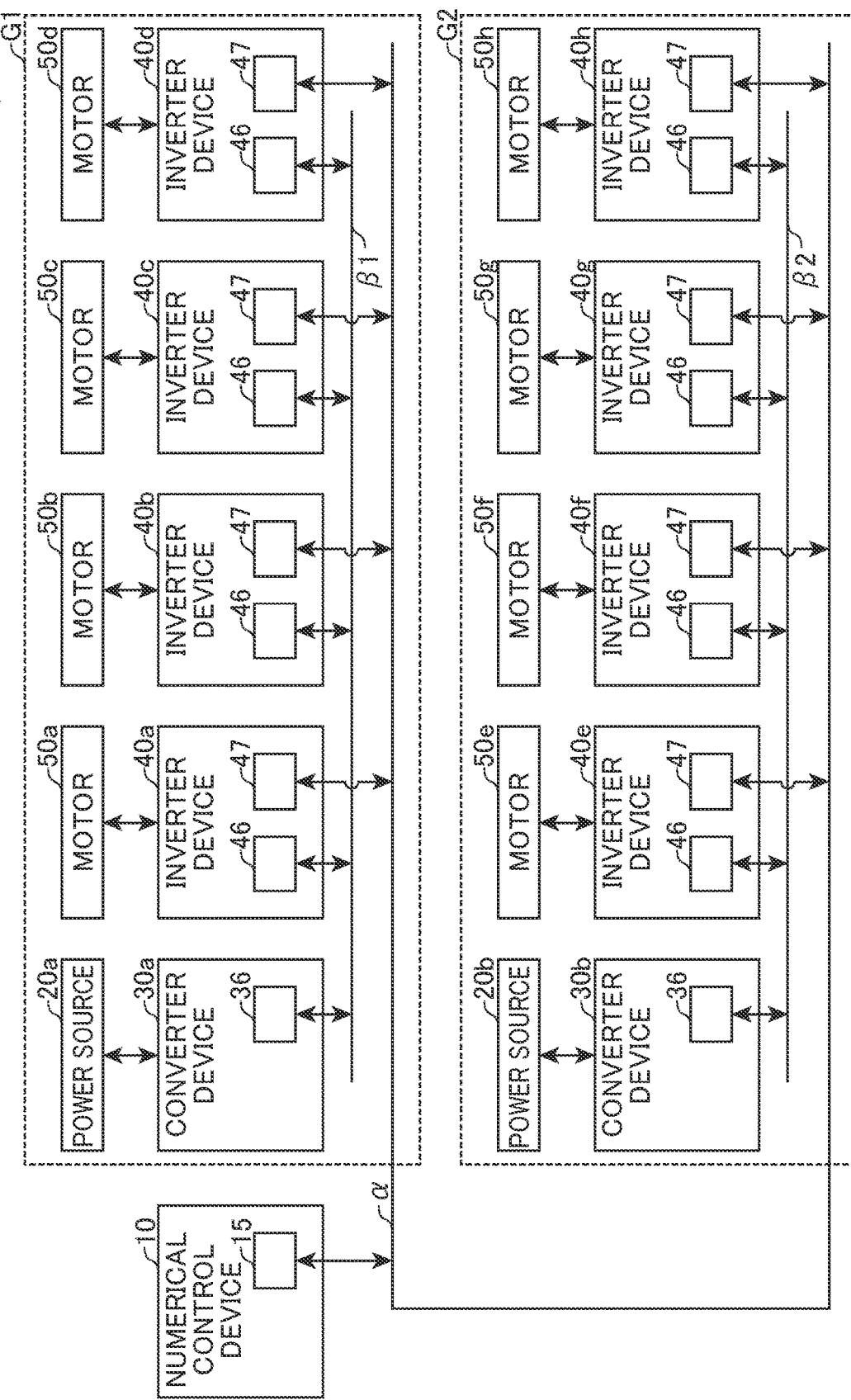
FIG. 1 is a diagram showing an example of a configuration of a servo control system according to an embodiment.
Figure 2:
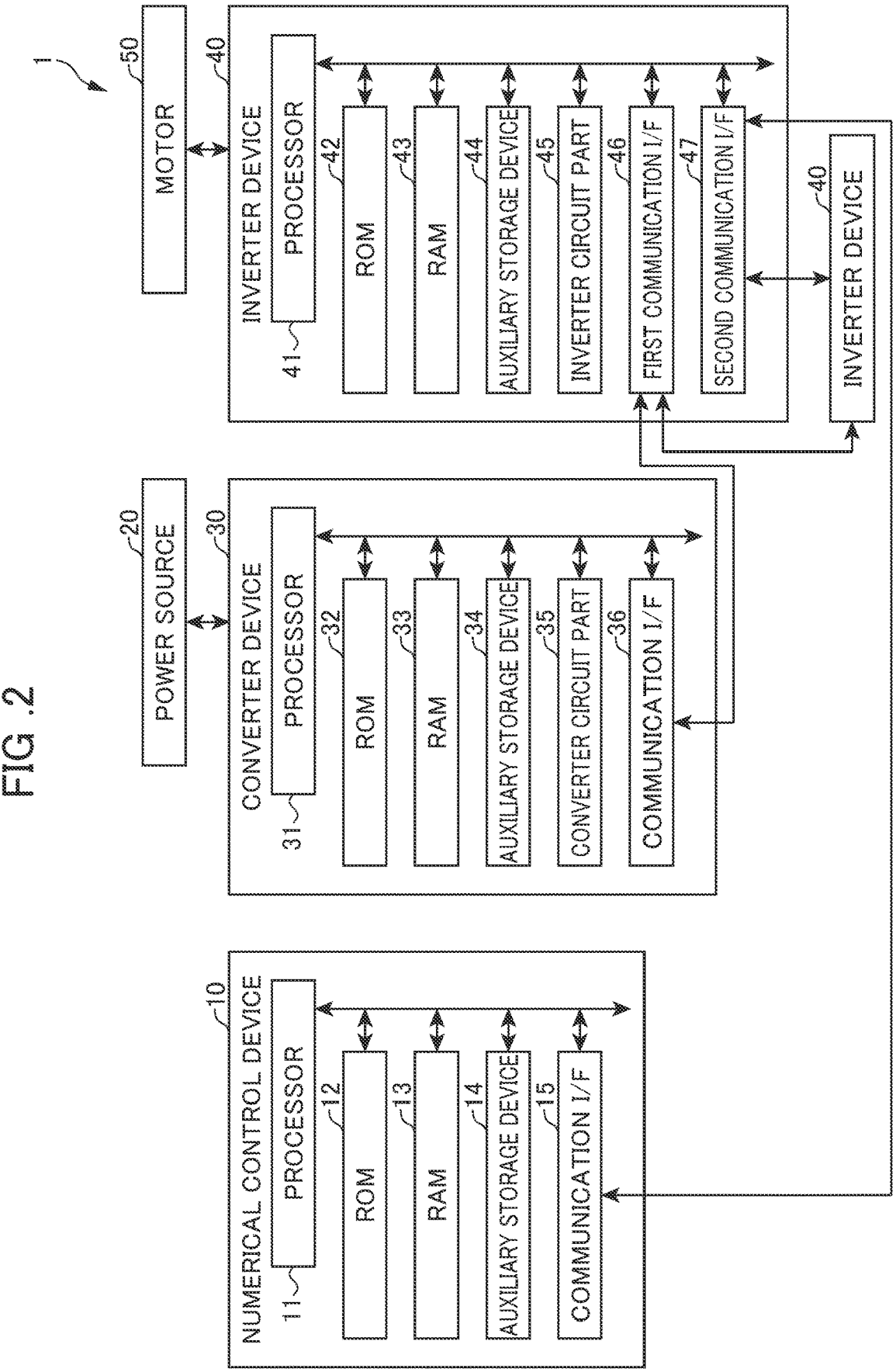
FIG. 2 is a block diagram showing an example of the main components of each of devices which are the constituent elements of the servo control system according to the embodiment.

Hereinafter, a servo control system according to an embodiment will be described with reference to the drawings. The configurations shown in the drawings used in the following description of the embodiment may be abbreviated for the sake of explanation. In the drawings and the specification, the same reference numeral indicates the same element. The configuration of a servo control system 1 according to the embodiment will be described with reference to FIGS. 1 and 2. FIG. 1 is a diagram showing an example of the configuration of the servo control system 1 according to the embodiment. FIG. 2 is a block diagram showing an example of the main components of each of devices which are the constituent elements of the servo control system 1 according to the embodiment. The servo control system 1 includes, for example, a numerical control device 10, a power source 20, a converter device 30, an inverter device 40, and a motor 50. The number of each of these devices is not limited to the number shown in the drawings. The servo control system is an example of a communication system for a numerical control device.

The servo control system 1 includes one or more groups G. FIG. 1 shows two groups G, a group G1 and a group G2. One group G includes one converter device 30 and one or more inverter devices 40. The converter device 30 supplies power to the inverter devices 40 in the same group. The group G1 includes, for example, a converter device 30a and inverter devices 40a to 40d. The group G2 includes, for example, a converter device 30b and inverter devices 40e to 40h. The converter device 30a and the converter device 30b are an example of a first converter device and a second converter device. The inverter device 40 in the same group G as the first converter device is an example of a first inverter device. The inverter device 40 in the same group G as the second converter device is an example of a second inverter device.

The numerical control device 10, for example, performs computerized numerical control (CNC) for a machine tool or the like. The numerical control device 10 controls, for example, the operation of the motor 50 and the like by way of CNC. The numerical control device 10 includes, for example, a processor 11, a ROM (read-only memory) 12, a RAM (random-access memory) 13, an auxiliary storage device 14, and a communication I/F (interface) 15.

The processor 11 corresponds to the central part of a computer that performs processing such as calculation and control necessary for the operation of the numerical control device 10. The processor 11 is, for example, a CPU (central processing unit), MPU (micro processing unit), SoC (system on a chip), DSP (digital signal processor), GPU (graphics processing unit), ASIC (application specific integrated circuit), PLD (programmable logic device), or FPGA (field-programmable gate array). Alternatively, the processor 11 is a combination of two or more of these. The processor 11 controls each part to implement various functions of the numerical control device 10 based on programs such as firmware, system software, and application software stored in the ROM 12, the auxiliary storage device 14, or the like. Further, the processor 11 executes the processing described later based on the programs. Part or all of the programs may be incorporated in the circuitry of the processor 11.

The ROM 12 corresponds to a main storage device of the computer with the processor 11 as the central part. The ROM 12 is a non-volatile memory used exclusively for reading data. The ROM 12 stores, for example, firmware among the above programs. The ROM 12 also stores data to be used when the processor 11 perform various processing.

The RAM 13 corresponds to a main storage device of the computer with the processor 11 as the central part. The RAM 13 is a memory used for reading and writing data. The RAM 13 is used as a work area or the like for storing data to be temporarily used when the processor 11 performs various processing. The RAM 13 is typically a volatile memory.

The auxiliary storage device 14 corresponds to an auxiliary storage device of the computer with the processor 11 as the central part. The auxiliary storage device 14 is, for example, an EEPROM (electric erasable programmable read-only memory), HDD (hard disk drive), or flash memory. The auxiliary storage device 14 stores, for example, system software and application software among the above programs. The auxiliary storage device 14 stores data to be used when the processor 11 performs various processing, data generated by processing by the processor 11, various setting values, and the like.

The communication I/F 15 is an interface for the numerical control device 10 to communicate with the inverter device 40 or the like via a transmission path α. The transmission path α is an example of a first transmission path. The communication I/F 15 is an example of a numerical control communication part that communicates with the inverter device 40 using the transmission path a.

The power source 20 is an alternating current (AC) power source that supplies AC power to the converter device 30.

The converter device 30 converts AC power supplied from the power source 20 into direct current (DC) power and outputs the DC power to the inverter device 40. The converter device 30 is also called PS (power supply) or the like. The converter device 30 includes, for example, a processor 31, a ROM 32, a RAM 33, an auxiliary storage device 34, a converter circuit part 35, and a communication I/F 36.

The processor 31 corresponds to the central part of a computer that performs processing such as calculation and control necessary for the operation of the converter device 30. The processor 31 is, for example, a CPU, MPU, SoC, DSP, GPU, ASIC, PLD, or FPGA. Alternatively, the processor 31 is a combination of two or more of these. The processor 31 controls each part to implement various functions of the converter device 30 based on programs such as firmware, system software, and application software stored in the ROM 32, the auxiliary storage device 34, or the like. Further, the processor 31 executes the processing described later based on the programs. Part or all of the programs may be incorporated in the circuitry of the processor 31.

The ROM 32 corresponds to a main storage device of the computer with the processor 31 as the central part. The ROM 32 is a non-volatile memory used exclusively for reading data. The ROM 32 stores, for example, firmware among the above programs. The ROM 32 also stores data to be used when the processor 31 performs various processing.

The RAM 33 corresponds to a main storage device of the computer with the processor 31 as the central part. The RAM 33 is a memory used for reading and writing data. The RAM 33 is used as a work area or the like for storing data to be temporarily used when the processor 31 performs various processing. The RAM 33 is typically a volatile memory.

The auxiliary storage device 34 corresponds to an auxiliary storage device of the computer with the processor 31 as the central part. The auxiliary storage device 34 is, for example, an EEPROM, HDD, or flash memory. The auxiliary storage device 34 stores, for example, system software and application software among the above programs. The auxiliary storage device 34 stores data to be used when the processor 31 performs various processing, data generated by processing by the processor 31, various setting values, and the like.

The converter circuit part 35 is an electric circuit that converts AC power into DC power.

The communication I/F 36 is an interface for the converter device 30 to communicate with the inverter device 40 or the like via a transmission path β. In FIG. 1, the transmission path β of the group G1 is shown as a transmission path β1, and the transmission path β of the group G2 is shown as a transmission path β2. The transmission path β is an example of a second transmission path. The communication I/F 36 is an example of a converter communication part that communicates with the inverter device 40 using the transmission path β.

The inverter device 40 converts DC power supplied from the converter device 30 into AC power of a desired frequency for driving the motor 50. The inverter device 40 includes an inverter device 40 for a servo motor and an inverter device 40 for a spindle motor. The inverter device 40 inputs AC power necessary for the operation of the motor 50 to the motor 50 based on an input instructing the operation of the motor 50 by the numerical control device 10. The inverter device 40 includes, for example, a processor 41, a ROM 42, a RAM 43, an auxiliary storage device 44, an inverter circuit part 45, a first communication I/F 46, and a second communication I/F 47.

The processor 41 corresponds to the central part of a computer that performs processing such as calculation and control necessary for the operation of the inverter device 40. The processor 41 is, for example, a CPU, MPU, SoC, DSP, GPU, ASIC, PLD, or FPGA. Alternatively, the processor 41 is a combination of two or more of these. The processor 41 controls each part to implement various functions of the inverter device 40 based on programs such as firmware, system software, and application software stored in the ROM 42, the auxiliary storage device 44, or the like. Further, the processor 41 executes the processing described later based on the programs. Part or all of the programs may be incorporated in the circuitry of the processor 41.

The ROM 42 corresponds to a main storage device of the computer with the processor 41 as the central part. The ROM 42 is a non-volatile memory used exclusively for reading data. The ROM 42 stores, for example, firmware among the above programs. The ROM 42 also stores data to be used when the processor 41 performs various processing.

The RAM 43 corresponds to a main storage device of the computer with the processor 41 as the central part. The RAM 43 is a memory used for reading and writing data. The RAM 43 is used as a work area or the like for storing data to be temporarily used when the processor 41 performs various processing. The RAM 43 is typically a volatile memory.

The auxiliary storage device 44 corresponds to an auxiliary storage device of the computer with the processor 41 as the central part. The auxiliary storage device 44 is, for example, an EEPROM, HDD, or flash memory. The auxiliary storage device 44 stores, for example, system software and application software among the above programs. The auxiliary storage device 44 stores data to be used when the processor 41 performs various processing, data generated by processing by the processor 41, various setting values, and the like.

The inverter circuit part 45 is an electric circuit that converts DC power into AC power.

The first communication I/F 46 is an interface for the inverter device 40 to communicate with the converter device 30 and another inverter device 40 or the like via the transmission path β.

The second communication I/F 47 is an interface for the inverter device 40 to communicate with the numerical control device 10 and another inverter device 40 or the like via the transmission path α.

The motor 50 is, for example, a motor such as a servo motor or a spindle motor that drives each part of a machine tool or the like. The motor 50 is an example of a device to be controlled by the inverter device 40.

Figure 3:
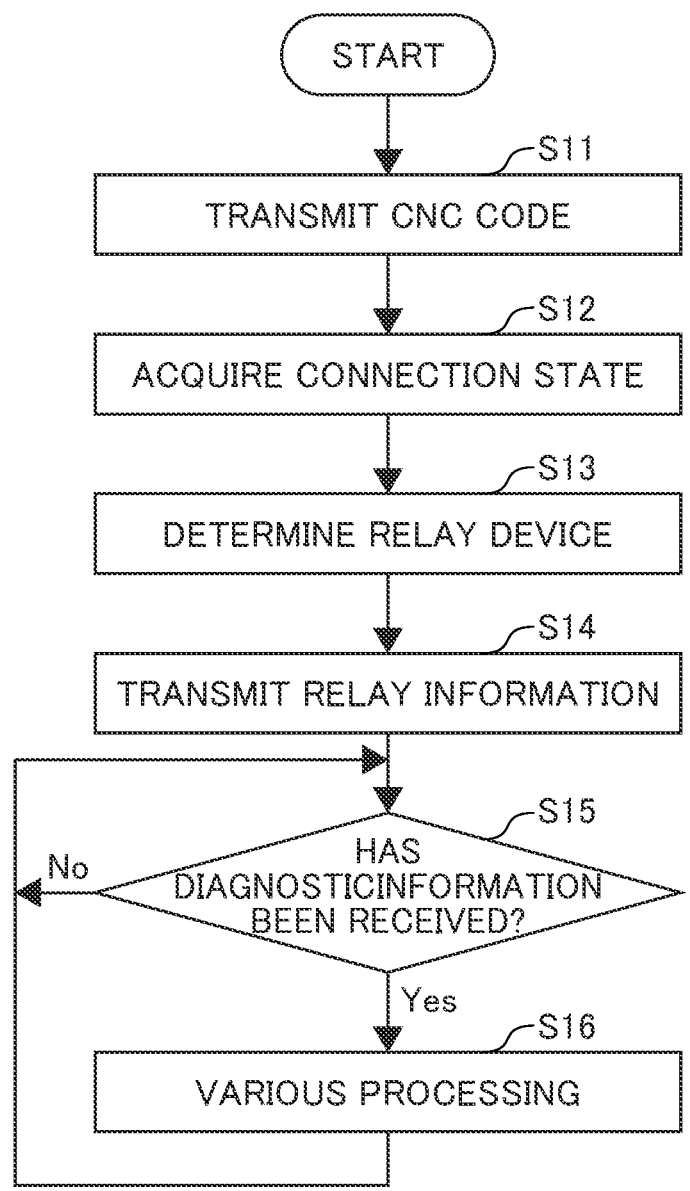
FIG. 3 is a flowchart showing an example of processing by a processor of a numerical control device shown in FIG. 2.
Figure 4:
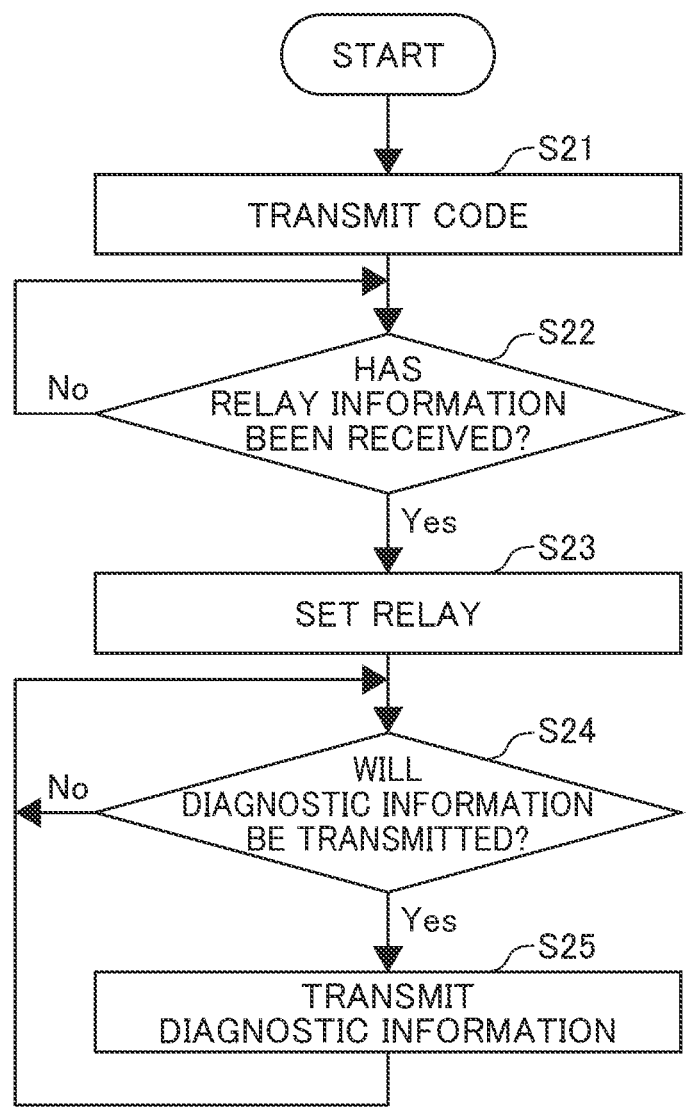
FIG. 4 is a flowchart showing an example of processing by a processor of a converter device shown in FIG. 2.

Hereinafter, the operation of the servo control system 1 according to the embodiment will be described with reference to FIGS. 3 to 5 and others. Note that the contents of the processing in the following description of the operation are examples, and various processing capable of obtaining similar results can be used as appropriate. FIG. 3 is a flowchart showing an example of processing by the processor 11 of the numerical control device 10. The processor 11 executes, for example, the processing shown in FIG. 3 based on a program stored in the ROM 12, the auxiliary storage device 14, or the like. FIG. 4 is a flowchart showing an example of processing by the processor 31 of the converter device 30. The processor 31 executes, for example, the processing shown in FIG. 4 based on a program stored in the ROM 32, the auxiliary storage device 34, or the like. FIG. 5 is a flowchart showing an example of processing by the processor 41 of the inverter device 40. The processor 41 executes, for example, the processing shown in FIG. 5 based on a program stored in the ROM 42, the auxiliary storage device 44, or the like.

The processor 11 of the numerical control device 10, for example, starts the processing shown in FIG. 3 upon start-up of the numerical control device 10. In Step S11 in FIG. 3, the processor 11 generates a CNC code. The CNC code is unique identification information for each inverter device 40. For example, the processor 11 respectively assigns CNC codes Ca to Ch to the inverter devices 40a to 40h. The processor 11, for example, sequentially establishes a connection between the numerical control device 10 and each of the inverter devices 40. The processor 11, for example, assigns a serial number indicating the order of these connections as a CNC code. For example, the processor 11 assigns the CNC code Ca to the inverter device 40a in which the connection was established 1st, assigns the CNC code Cb to the inverter device 40b in which the connection was established 2nd, assigns the CNC code Cc to the inverter device 40c in which the connection was established 3rd, . . . . After generating a CNC code, the processor 11 instructs the communication I/F 15 to transmit the generated CNC code to an inverter device 40 to which the CNC code is to be assigned. In response to this transmission instruction, the communication I/F 15 transmits the CNC code to the inverter device 40. The transmitted CNC code is received by the second communication I/F 47 of the inverter device 40. As described above, the processor 11 performs the processing shown in Step S11, thereby functioning as an assigning part (first assigning part) that assigns the CNC code to the inverter device. The CNC code is an example of first identification information.

Meanwhile, the processor 31 of the converter device 30, for example, starts the processing shown in FIG. 4 upon start-up of the converter device 30. In Step S21 in FIG. 4, the processor 31 generates a PS code. The PS code is unique identification information for each inverter device 40 in the same group G. For example, the processor 31 of the converter device 30a respectively assigns PS codes C1 to C4 to the inverter devices 40a to 40d. For example, the processor 41 of the converter device 30b respectively assigns the PS codes C1 to C4 to the inverter devices 40e to 40h. Thus, the PS codes may be duplicated as long as they are in different groups G. The processor 31, for example, sequentially establishes a connection between the converter device 30 and each of the inverter devices 40 in the same group G. The processor 31, for example, assigns a serial number indicating the order of these connections as a PS code. For example, the processor 31 of the converter device 30a assigns the PS code C1 to the inverter device 40a in which the connection was established 1st, assigns the PS code C2 to the inverter device 40b in which the connection was established 2nd, assigns the PS code C3 to the inverter device 40c in which the connection was established 3rd, . . . . For example, the processor 31 of the converter device 30b assigns the PS code C1 to the inverter device 40e in which the connection was established 1st, assigns the PS code C2 to the inverter device 40f in which the connection was established 2nd, assigns the PS code C3 to the inverter device 40g in which the connection was established 3rd. . . . After generating a PS code, the processor 31 instructs the communication I/F 36 to transmit the generated PS code to an inverter device 40 to which the PS code is to be assigned. In response to this transmission instruction, the communication I/F 36 transmits the PS code to the inverter device 40. The transmitted PS code is received by the first communication I/F 46 of the inverter device 40. As described above, the processor 31 performs the processing in Step S21, thereby functioning as an assigning part (second assigning part) that assigns the PS code to the inverter device. The PS code is an example of second identification information.

Meanwhile, the processor 41 of the inverter device 40, for example, starts the processing shown in FIG. 5 upon start-up of the inverter device 40. In Step S31 in FIG. 5, the processor 41 determines whether a CNC code has been received by the second communication I/F 47. If no CNC code has been received, the processor 41 determines No in Step S31 and proceeds to Step S32. In Step S32, the processor 41 determines whether a PS code has been received by the first communication I/F 46. If no PS code has been received, the processor 41 determines No in Step S32 and proceeds to Step S33. In Step S33, the processor 41 determines whether first relay information has been received by the second communication I/F 47. If no first relay information has been received, the processor 41 determines No in Step S33 and proceeds to Step S34.

In Step S34, the processor 41 determines whether first diagnostic information has been received by the first communication I/F 46. If no first diagnostic information has been received, the processor 41 determines No in Step S34 and returns to Step S31. Thus, the processor 41 is in a standby state in which Steps S31 to S34 are repeated until a CNC code, PS code, first relay information, or first diagnostic information is received. The first relay information and the first diagnostic information will be described later.

If a CNC code is received in the standby state in which Steps S31 to S34 are repeated, the processor 41 determines Yes in Step S31 and proceeds to Step S35.

In Step S35, the processor 41 stores the received CNC code in the RAM 43, the auxiliary storage device 44, or the like. After the processing of Step S35, the processor 41 returns to Step S31.

If a PS code is received in the standby state in which Steps S31 to S34 are repeated, the processor 41 determines Yes in Step S32 and proceeds to Step S36.

In Step S36, the processor 41 stores the received PS code in the RAM 43, the auxiliary storage device 44, or the like. After the processing of Step S36, the processor 41 returns to Step S31.

Meanwhile, in Step S12 in FIG. 3, the processor 11 of the numerical control device 10 acquires, for each inverter device 40, the connection state indicating the quality of communication or the like between the inverter device 40 and the converter device 30 in the same group as the inverter device 40. The connection state indicates, for example, a communication distance between the converter device 30 and the inverter device 40. For example, the processor 11 acquires the communication distance from information indicating the communication distance stored in the auxiliary storage device 14 or the like. Alternatively, the processor 11 may measure the communication distance. For measuring the communication distance, delay or loss of communication or the like can be used. Alternatively, the processor 11 may acquire the delay or loss of communication between the converter device 30 and the inverter device 40 as the connection state. Alternatively, the processor 11 may acquire the PS code assigned to each inverter device 40 as the connection state. Normally, the shorter the communication distance is, the earlier the communication is established and the PS code is assigned. Therefore, the PS code assigned as a serial number is information indicating the connection state.

In Step S13, the processor 11 determines, for each group G, an inverter device 40 used for relaying communication when the first diagnostic information is transmitted from the converter device 30 to the numerical control device 10 (hereinafter, referred to as a "relay device"). For example, the processor 11 determines the inverter device 40 having the best connection state in each group G. Here, a good connection state means, for example, that the communication distance is short, the communication delay is small, or the communication loss is small. Alternatively, the processor 11 may determine, as the relay device, the inverter device 40 having the lowest PS code assigned as a serial number, i.e., the inverter device 40 to which the PS code is assigned first in Step S21 in FIG. 4, among the inverter devices 40 in the group G, by assuming that the communication distance is the shortest. As described above, the processor 11 functions as the determination part that determines the relay device by performing the processing of Step S13.

In Step S14 in FIG. 3, the processor 11 generates the first relay information. The first relay information includes information indicating that the relay device is designated. After generating the first relay information, the processor 11 instructs the communication I/F 15 to transmit the first relay information to each of the inverter devices 40 determined in Step S13. In response to this transmission instruction, the communication I/F 15 transmits the first relay information to each of the inverter devices 40. The transmitted first relay information is received by the second communication I/F 47 of each of the inverter devices 40.

Meanwhile, if the first relay information is received in the standby state in which Steps S31 to S34 are repeated in FIG. 5, the processor 41 of the inverter device 40 determines Yes in Step S33 and proceeds to Step S37. In Step S37, the processor 41 generates the second relay information. The second relay information includes the first relay information received in Step S33, the CNC code stored in Step S35, and the PS code stored in Step S36. After generating the second relay information, the processor 41 instructs the first communication I/F 46 to transmit the second relay information to the converter device 30. In response to this transmission instruction, the first communication I/F 46 transmits the second relay information to the converter device 30. The transmitted second relay information is received by the communication I/F 36 of the converter device 30.

Meanwhile, in Step S22 in FIG. 4, the processor 31 of the converter device 30 waits for the second relay information to be received by the communication I/F 36. If the second relay information is received, the processor 31 determines Yes in Step S22 and proceeds to Step S23.

In Step S23, the processor 31 sets a relay device used for transmitting the first diagnostic information. That is, the processor 31 stores the PS code included in the second relay information received in Step S22, in the RAM 33, the auxiliary storage device 34, or the like, as information indicating the relay device for transmitting the first diagnostic information.

In Step S24, the processor 31 determines whether to transmit the first diagnostic information.

The first diagnostic information includes, for example, information indicating a state of the converter device 30 or the power source 20.

The first diagnostic information includes, for example, alarm information of an amplifier, a fan, or the like included in the converter device 30 or the power source 20, or information indicating an abnormality in current or voltage in the converter device 30 or the power source 20.

The alarm information is, for example, information indicating that an abnormal operation is detected.

The processor 31 determines to transmit the first diagnostic information when a predetermined timing is reached, for example.

Alternatively, the processor 31 determines to transmit the first diagnostic information when detecting an abnormal operation of the converter device 30 or the power source 20, or when detecting an abnormality in current or voltage in the converter device 30 or the power source 20, for example.

If the processor 31 does not determine to transmit the first diagnostic information, the processor 31 determines No in Step S24 and repeats the processing of Step S24.

On the other hand, if the processor 31 determines to transmit the first diagnostic information, the processor 31 determines Yes in Step S24 and proceeds to Step S25.

In Step S25, the processor 31 generates first diagnostic information by performing self-diagnosis or the like. After generating the first diagnostic information, the processor 31 instructs the communication I/F 36 to transmit the first diagnostic information to the relay device, i.e., the inverter device 40 to which the PS code stored in Step S23 is assigned. In response to this transmission instruction, the communication I/F 36 transmits the first diagnostic information to the inverter device 40. The transmitted first diagnostic information is received by the first communication I/F 46 of the inverter device 40. After the processing of Step S25, the processor 31 returns to Step S24.

Meanwhile, if the first diagnostic information is received in the standby state in which Steps S31 to S34 are repeated in FIG. 5, the processor 41 of the inverter device 40 determines Yes in Step S34 and proceeds to Step S38. In Step S38, the processor 41 generates the second diagnostic information. The second diagnostic information includes the first diagnostic information received in Step S34, the CNC code stored in Step S35, and the PS code stored in Step S36. After generating the second diagnostic information, the processor 41 instructs the second communication I/F 47 to transmit the second diagnostic information to the numerical control device 10. In response to this transmission instruction, the second communication I/F 47 transmits the second diagnostic information to the numerical control device 10. The transmitted second diagnostic information is received by the communication I/F 15 of the numerical control device 10. After the processing of Step S38, the processor 41 returns to Step S31.

Meanwhile, in Step S15 in FIG. 3, the processor 11 of the numerical control device 10 waits for the second diagnostic information to be received by the communication I/F 15. If the second diagnostic information is received, the processor 11 determines Yes in Step S15 and proceeds to Step S16.

In Step S16, the processor 11 performs various processing according to the contents of the received second diagnostic information. After the processing of Step S16, the processor 11 returns to Step S15.

In the servo control system 1 according to the embodiment, the numerical control device is not directly connected to the converter device, and a plurality of converter devices are not directly connected to each other. Therefore, the servo control system 1 according to the embodiment can reduce communication traffic compared to conventional ones. In addition, the servo control system 1 according to the embodiment can reduce the cost of the transmission path compared to conventional ones.

Further, according to the servo control system 1 of the embodiment, the converter device 30 transmits the first diagnostic information to one inverter device 40. Accordingly, the second diagnostic information transmitted to the numerical control device 10 is one piece of information from one group G. In contrast, a conventional converter device transmits diagnostic information to all the inverter devices in the same group. Therefore, in a conventional servo control system, the diagnostic information is transmitted from all the inverter devices to the numerical control device. As described above, the servo control system 1 according to the embodiment can reduce the communication traffic required for transmission of diagnostic information compared to conventional ones.

According to the servo control system 1 of the embodiment, the numerical control device 10 can identify the inverter device 40 that is the source of the second diagnostic information by using the PS code or the CNC code included in the second diagnostic information. In addition, the converter device 30 can identify the inverter device 40 that is the source of the second relay information by using the PS code or the CNC code included in the second relay information.

According to the servo control system 1 of the embodiment, even when the plurality of groups G are included, the numerical control device 10 can identify the inverter device 40 that is the source of the second diagnostic information by using the CNC code.

The servo control system 1 of the embodiment determines the relay device using a connection state of communication such as a communication distance. Therefore, the servo control system 1 of the embodiment can transmit the diagnostic information using the inverter device 40 which is considered to have the best communication state.

The servo control system 1 of the embodiment determines the inverter device 40 in which the PS code is assigned first, as the relay device. Therefore, the servo control system 1 according to the embodiment can easily determine the relay device only by comparing the PS codes.

The above embodiment can be modified as follows. In the above embodiment, the converter device 30 transmits the first diagnostic information to the numerical control system 10 via the inverter device 40. However, the converter device 30 may transmit information other than the first diagnostic information in the same manner as the first diagnostic information.

In the above embodiment, the numerical control device 10 determines which inverter device 40 is used as a relay device. However, instead of the numerical control device 10, the converter device 30 may determine which inverter device 40 is used as a relay device.

The device to be controlled by the inverter device 40 may be a device other than the motor 50.

The processor 11, the processor 31, or the processor 41 may implement part or all of the processing implemented by the programs in the above embodiment by way of a hardware configuration of the circuitry.

A program that implements the processing of the embodiment is transferred, for example, in a state stored in a device. However, the device may be transferred in a state in which the program is not stored. The program may be separately transferred and written into the device. For example, the transfer of the program can be realized by recording the program in a removable storage medium or downloading the program via a network such as the Internet or a LAN (local area network).

The above descriptions of the embodiments of the present invention are provided as examples and do not limit the scope of the present invention. The embodiments of the present invention can be implemented in various modes without departing from the gist of the present invention.

EXPLANATION OF REFERENCE NUMERALS 1 servo control system
10 numerical control device
11, 31, 41 processor
12, 32, 42 ROM
13, 33, 43 RAM
14, 34, 44 auxiliary storage device
15, 36 communication I/F
20 power source
30 converter device
35 converter circuit part
40 inverter device
45 inverter circuit part
46 first communication I/F
47 second communication I/F
50 motor

The invention claimed is:

1. A communication system for a numerical control device, including a numerical control device, a converter device, and a plurality of inverter devices, the communication system comprising:
   an assigning part configured to assign identification information to the plurality of inverter devices; and
   a determination part configured to determine an inverter device to be used for communication between the numerical control device and the converter device from among the plurality of inverter devices to which the identification information is assigned,
   the numerical control device comprising a numerical control communication part configured to communicate with the inverter device using a first transmission path, and
   the converter device comprising a converter communication part configured to communicate with the numerical control device via a second transmission path different from the first transmission path, the inverter device determined by the determination part, and the first transmission path.

2. The communication system according to claim 1,
   wherein the converter device comprises a first converter device and a second converter device different from the first converter device, the plurality of inverter devices comprise a plurality of first inverter devices and a plurality of second inverter devices different from the plurality of first inverter devices, the assigning part comprises a first assigning part and a second assigning part, and the identification information comprises first identification information and second identification information,
   wherein the first converter device is configured to communicate with the plurality of first inverter devices, and the second converter device is configured to communicate with the plurality of second inverter devices,
   wherein the numerical control device comprises the first assigning part configured to assign the first identification information to the plurality of inverter devices,
   wherein the first converter device comprises the second assigning part configured to assign the second identification information to the plurality of first inverter devices, and
   wherein the determination part is configured to determine a first inverter device to be used for communication between the numerical control device and the first converter device from among the plurality of inverter devices to which the first identification information and the second identification information are assigned.

3. The communication system according to claim 1, wherein the determination part is configured to determine the inverter device to be used for the communication between the numerical control device and the converter device, using connection states of communication using the plurality of inverter devices.

4. The communication system according to claim 1,
   wherein the assigning part comprised by the converter device is configured to assign the identification information to the plurality of inverter devices in an order in which connection with the converter device is established, and
   wherein the determination part is configured to determine an inverter device to which the identification information is assigned first as the inverter device to be used for the communication between the numerical control device and the converter device.

5. A communication method for a numerical control device, the communication method comprising:
   assigning identification information to a plurality of inverter devices; and
   determining an inverter device to be used for communication between a numerical control device and a converter device from among the plurality of inverter devices to which the identification information is assigned,
   the numerical control device being configured to communicate with the inverter device using a first transmission path, and
   the converter device being configured to communicate with the numerical control device via a second transmission path different from the first transmission path, the inverter device determined to be used for the communication between the numerical control device and the converter device, and the first transmission path.

* * * * *